United States Patent [19]

Watkins et al.

[11] 4,183,562
[45] Jan. 15, 1980

[54] MARINE RISER CONDUIT SECTION COUPLING MEANS

[75] Inventors: Bruce J. Watkins, Rancho Palos Verdes; A. Michael Regan, Huntington Beach; William P. Slata, Northridge, all of Calif.

[73] Assignee: Regan Offshore International, Inc., Torrance, Calif.

[21] Appl. No.: 783,636

[22] Filed: Apr. 1, 1977

[51] Int. Cl.² ............................................. F16L 23/00
[52] U.S. Cl. ...................................... 285/405; 285/23; 285/24
[58] Field of Search .................... 285/24, 27, 23, 405, 285/416, 419, 373, 114, 286, 18, 363, 140–148; 61/72.3; 175/7; 166/0.5, 0.6

[56] References Cited

U.S. PATENT DOCUMENTS

| | | | |
|---|---|---|---|
| 1,589,917 | 6/1926 | Williams | 285/419 X |
| 2,082,173 | 6/1937 | Miller | 285/363 X |
| 3,248,130 | 4/1966 | Knight | 285/27 |
| 3,305,249 | 2/1967 | Zahuranec | 285/24 |
| 3,404,903 | 10/1968 | Frantz | 285/363 X |
| 3,717,002 | 2/1973 | O'Brien et al. | 285/24 |

FOREIGN PATENT DOCUMENTS

| | | | |
|---|---|---|---|
| 1018681 | 11/1953 | Fed. Rep. of Germany | 285/416 |
| 1468044 | 12/1966 | France | 285/363 |
| 698791 | 10/1953 | United Kingdom | 285/363 |

*Primary Examiner*—Dave W. Arola
*Attorney, Agent, or Firm*—Poms, Smith, Lande & Rose

[57] ABSTRACT

Marine riser conduit section coupling means adapted to withstand high riser tension and bending loads in deep sub sea well drilling and production operations by preventing stress concentrations has upper and lower coupling members, each being mounted to an associated marine conduit section, and fastening means for securing the coupling members together wherein the outer surface configuration for each said coupling member comprises an effectively continuous arcuate surface extending circumferentially about substantially the entire outer surface of each coupling member from one axial extremity thereof adjacent the associated conduit section to an opposite extremity thereof adjacent outer marginal areas of the associated member flange. The fastening means include threaded bolts and means for preventing their inadvertent removal from a connector flange when disconnected from the mating flange.

A preferred outer surface configuration for each coupling member is substantially a quarter of an ellipse whose major axis is parallel to the bore of the riser, and said major axis being approximately twice the length of the minor axis.

4 Claims, 7 Drawing Figures

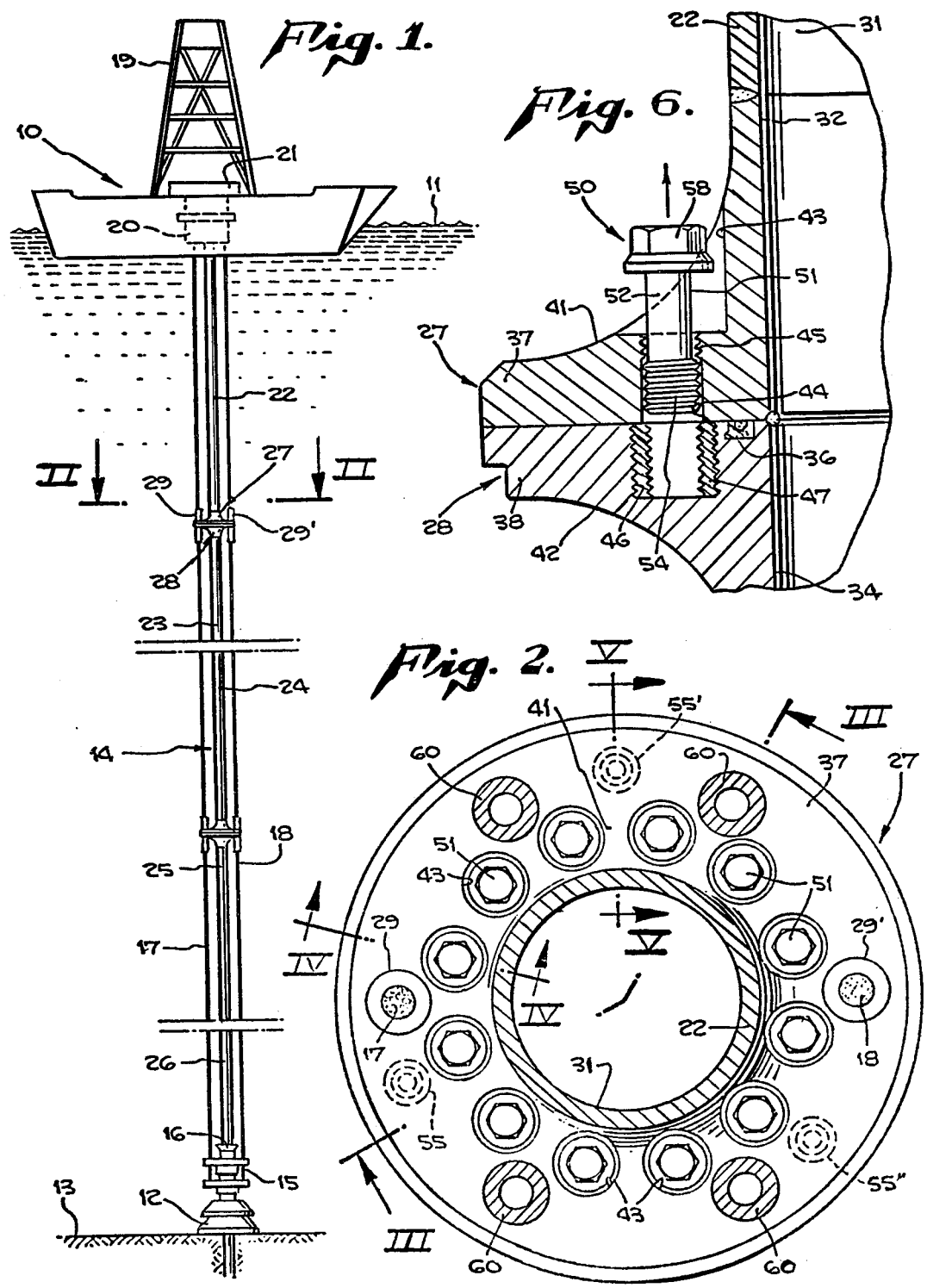

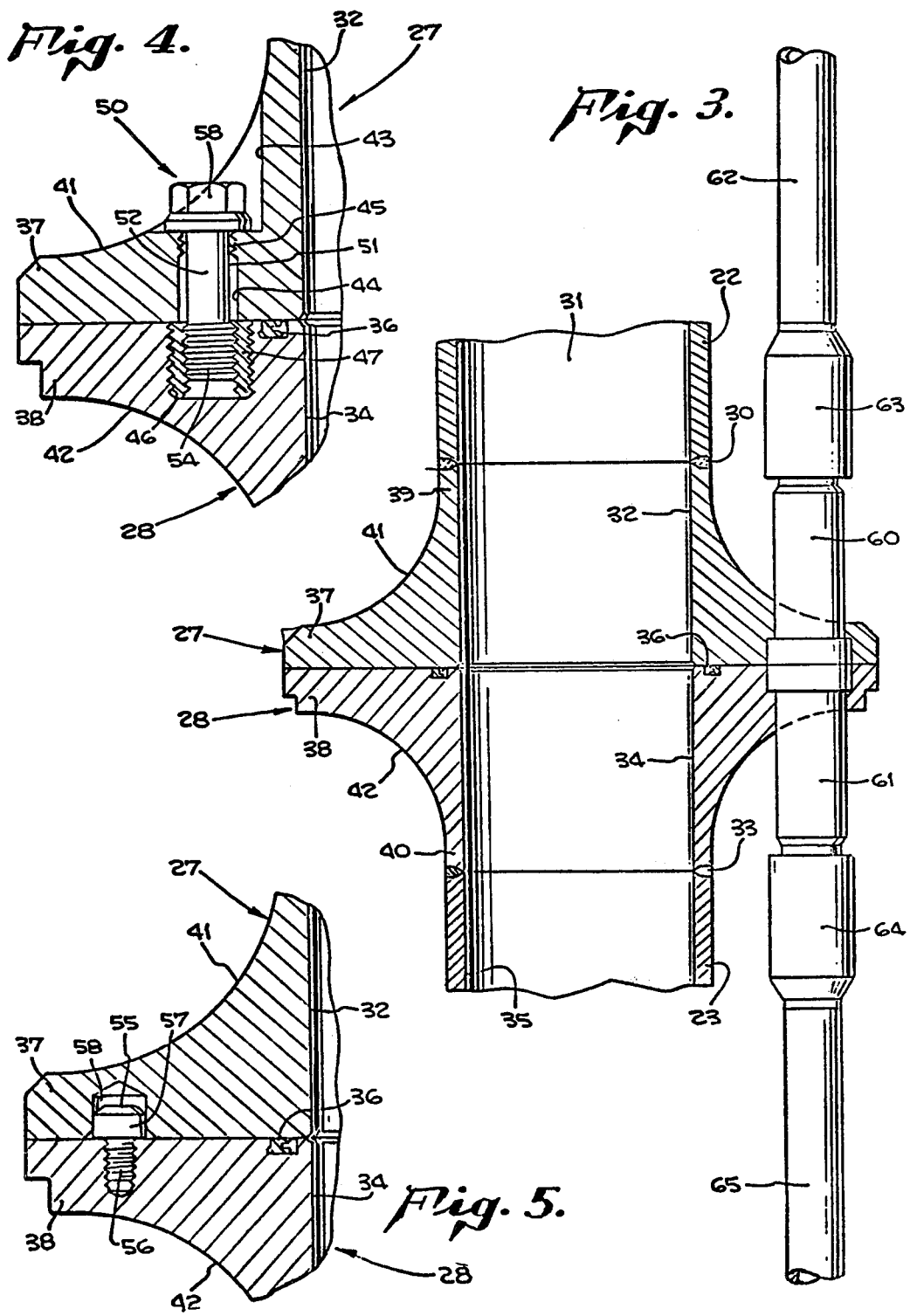

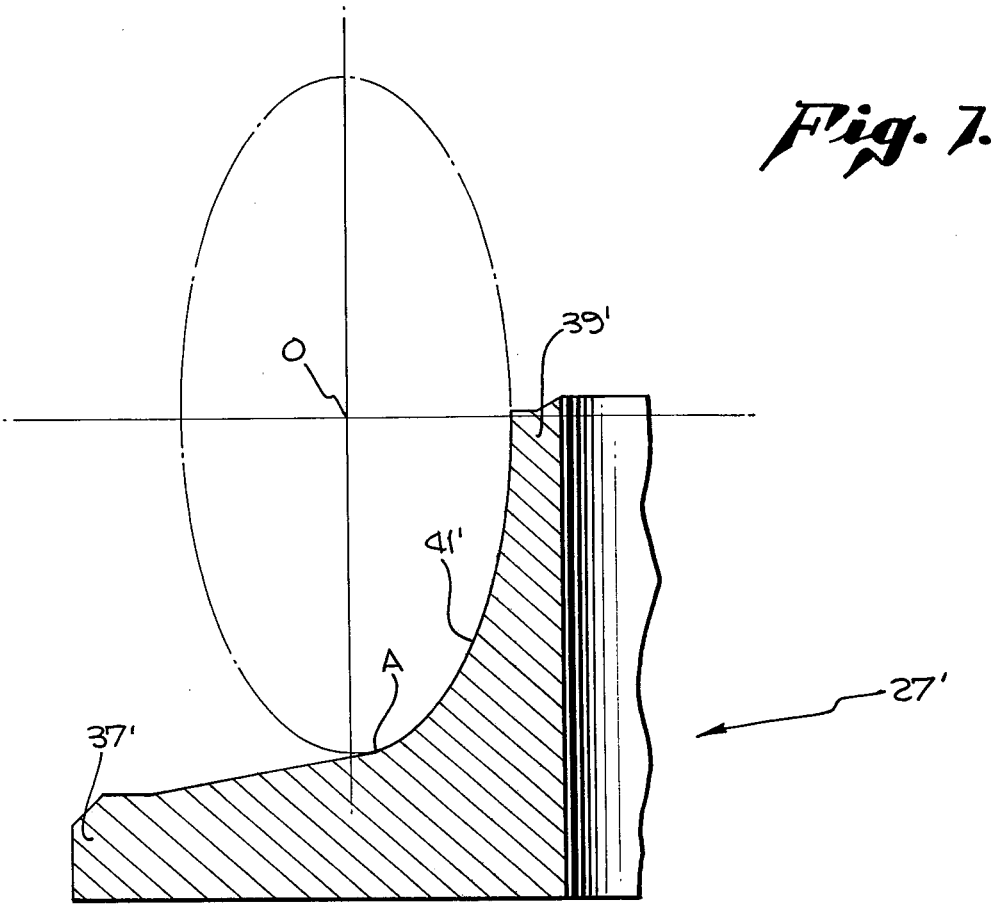

MARINE RISER CONDUIT SECTION COUPLING MEANS

BACKGROUND OF THE INVENTION

This invention relates generally to marine riser conduit section coupling means which are adapted to withstand high riser tension and bending loads in deep subsea well drilling and production operations by preventing stress concentrations. More specifically, the present invention relates to a construction of coupling means for optimizing the distribution of tension and bending loads through the coupling in a practical manner when employed in association with a marine riser conduit run in sections from a floating vessel to a very deep subsea well.

Heretofore it has been common to run marine risers from floating vessels or platforms to subsea well heads for various drilling and production operations. The marine riser comprises a plurality of conduit sections which are assembled together on the vessel or platform and run by known means from the vessel down to the well. As deeper and deeper well drilling and production operations have been undertaken, the tension and bending loads imparted to the riser and its conduit sections have been increasing. It has been found that the heretofore conventionally used coupling means for fastening successive riser conduit sections together may be inadequate to withstand these very high loads by allowing the production of stress concentrations. Specifically, prior coupling means which employ a plurality of movable dog means on one mating member and a peripheral groove on the other mating member tend to concentrate the stresses imparted to the coupling under these tension and bending loads in a central area of the coupling where the movable dog members and mating groove means are provided, respectively.

It has therefore been recognized that an improved coupling means is needed for the specific situation of very deep well drilling and production operations in association with a marine riser run in successive joined sections to a very deep well head.

SUMMARY OF THE INVENTION

It is therefore a primary object of the present invention to disclose and provide a marine riser conduit section coupling means which is adapted to withstand high riser tension and bending loads in deep subsea well drilling and production operations overcoming the tendencies of prior coupling members for riser conduit sections to cause stress concentrations in use.

It is a further object of the present invention to disclose and provide an improved marine riser conduit section coupling as in the foregoing object wherein the coupling members are designed to achieve a practical optimum distribution of bending stresses in the coupling members due to such riser bending movement and the tension and bending loads imparted to the couplings in such situations.

It is another object of this invention to provide a coupling member for deep subsea risers which has the approximate size and weight of conventional coupling members but which also combines the benefits of an outer surface configuration which practically optimizes the stress and bending distribution along the coupling member by preventing stress concentrations.

Generally stated, the foregoing objects are attained by the present invention through the provision of upper and lower coupling members, each being mounted or integrally attached to a marine conduit section with an inner coupling member bore aligned with the associated conduit section bore, the members having facing flanges, fastening means for securing the coupling members together at the flanges and means on each of the coupling members for achieving a practical optimum distribution of bending stress in the coupling members with no stress concentrations through the provision of an outer surface configuration for each such coupling member comprising an effectively continuous arcuate surface extending circumferentially about substantially the entire outer surface of each coupling member from one axial extremity thereof adjacent the associated conduit section to an opposite extremity thereof adjacent outer marginal areas of the associated flange. More specifically, the arcuate surface of one of the coupling members is interrupted periodically by shallow bolt head receiving recesses to accommodate bolt means of the aforementioned fastening means and means are provided for preventing the inadvertent removal of a bolt from the associated flange even though it has been disconnected from the associated flange. Locating means are also provided in accordance with the present invention for orienting the two coupling members to one another preparatory to operation of the fastening means to hold the coupling members in a predetermined relative positioning thereof. In particular, the preferred configuration of the outer surface substantially comprises a quarter of an ellipse which runs from one axial extremity of the coupling member to the other axial extremity.

The foregoing objects, as well as additional objects and various additional advantages of the present invention will become more readily understandable to persons of ordinary skill in the art from a consideration of the following detailed description of preferred exemplary embodiments of the marine riser conduit section coupling means of the present invention. Reference will be made in such detailed description to the appended sheets of drawings which will be now described briefly.

BRIEF DESCRIPTION OF THE DRAWINGS

FIG. 1 is a side elevational view of a subsea wellhead, a vessel on the surface of the sea and a string of marine riser conduit sections extending between the vessel and the wellhead, with the conduit sections coupled by a preferred exemplary embodiment of the marine riser conduit section coupling in accordance with the present invention;

FIG. 2 is a section view of the apparatus of FIG. 1 taken therein along the plane II—II showing an exemplary embodiment of the coupling in plan view;

FIG. 3 is a vertical section view through the coupling and riser conduit sections of FIGS. 1 and 2 taken in FIG. 2 along the plane III—III;

FIG. 4 is a detail view of a portion of the coupling of FIG. 3 showing an exemplary embodiment of fastening means for holding the coupling members together;

FIG. 5 is a detail view of the coupling of FIG. 3 showing an exemplary embodiment of locating pin means for aligning the coupling members in a predetermined relationship preparatory to being fastened together;

FIG. 6 is a detail view of a preferred exemplary embodiment of coupling as in FIG. 4 showing the preferred exemplary embodiment of fastening means in an unfastened condition; and FIG. 7 is a detail view of the most preferred configuration of the outer surface of the coupling.

DESCRIPTION OF THE PREFERRED EXEMPLARY EMBODIMENTS

Referring firstly to FIG. 1 of the drawings, a typical sub sea oil well installation is shown for purposes of illustrating the environment of the exemplary embodiment in marine riser conduit section coupling of the present invention. An exemplary floating vessel, indicated generally at 10, is shown floating on the surface of the sea 11 over a wellhead assembly 12 situated at the ocean floor 13. The marine riser conduit 14 is shown run from the floating vessel down to the wellhead 12, the latter being provided with conventional blow out preventers 15 and riser connector 16.

In the exemplary embodiment of FIG. 1, a pair of guide lines 17 and 18 are shown run from the floating vessel to the sub sea wellhead for use in guiding the riser conduit sections through the well head from the vessel derrick 19 through the conventional well 20 of the vessel. A rotary table 21 is shown on the vessel over well 20. Marine riser casing sections 22-26 are shown connected by coupling means in accordance with the present invention, such means including an upper connector member 27, positioned on the lower end of a conduit section, and a lower connector member 28, positioned on an upper end of a preceding conduit section, such as illustrated in association with sections 22 and 23 in FIG. 1. Guide sleeves 29 are shown mounted to the connector members for use in guiding them and the associated marine riser conduit sections from the vessel to the well in a manner generally known heretofore.

A preferred exemplary embodiment of marine riser conduit section coupling means in accordance with the present invention is illustrated in detail in FIGS. 2 through 6. Referring initially to FIGS. 2 and 3, the preferred exemplary embodiment of connector means includes the aforementioned upper connector member 27 and lower connector member 28 mounted to their respective conduit sections 22 and 23, respectively, by appropriate means such as welds 30 and 33. Upper connector member 27, as seen in FIG. 3, has its inner bore 32 aligned and connected to the associated riser section bore 31 by means of weld 30. Similarly, lower connector member 28 has its inner bore 34 aligned and connected to the associated riser section bore 35 by weld 33. When in assembled relation as illustrated in FIG. 3, the connector members may have their bores sealed from the surrounding environment by means of an appropriate annular seal means 36 located between flanges 37 and 38 of the respective coupling members 27 and 28.

As is particularly contemplated within the present invention, each riser conduit section coupling member is provided with an exterior surface configuration which is designed in a manner to allow the coupling to withstand the high riser tension and bending loads normally encountered in deep subsea well drilling and production operations in a manner not heretofore attainable by the preventing of stress concentrations. Specifically, in accordance with the present invention, the outer surface configuration for each of the coupling members is provided in the form of an effectively continuous arcuate surface extending about substantially the entire outer surface of each coupling member from one extremity thereof adjacent the associated conduit section to the other extremity thereof adjacent outer marginal areas of the coupling member flanges 37 and 38, as will now be described in detail.

It is the intention herein, by the use of the term "stress concentration" to mean the presence of stress greater than about twice the value of the average stress present in the linear riser conduit section. In other words, it is the object of this invention to prevent the presence of stress, both tension and bending, throughout the coupling member which would be twice that present in the linear riser conduit section. For example, if the average tensile stress present in one riser conduit section is 25,000 lbs. per sq. in., then having no "stress concentration" in the associated coupling members would mean that no point in the coupling would experience a stress of greater than about 50,000 lbs. per sq. in.

As seen in FIG. 3, each coupling member 27 and 28 has a base formed by the associated flanges 37 and 38 respectively. The opposite extremity of each coupling member comprises a tubular portion or top extremity 39 and 40, respectively. Extending effectively continuously from the top extremities, 39 and 40 of each coupling, to the outer marginal areas of each flange 37 and 38, respectively, are the effectively continuous arcuate surfaces 41 and 42 respectively. Surfaces 41 and 42 are arcuate, curved or non-linear, when viewed in cross section in FIG. 3 and extend circumferentially around the exterior of each of the members. By so providing the exterior configuration of each coupling member, its resistance to failure under the high riser tension and bending loads normally imparted to a sub sea marine riser conduit coupling are effectively distributed through the coupling without causing stress concentration in any particular portions thereof as is true in the prior art couplings employed in these types of risers.

Fastening means are provided for securing the coupling members together by their respective flanges to hold the coupling sections interconnected during sub sea well operations. As seen in FIGS. 4 and 6, the preferred exemplary embodiment of fastening means includes the provision of bolts on one of the coupling members adapted to be screwed into mating means on the flange of the other coupling member. Specifically, coupling member 27 has its effectively continuous surface 41 interrupted minimally by recesses 43 for receiving the fastening means indicated generally at 50. A bore 44 is provided centrally of each recess 43 with only an upper portion thereof threaded by threads 45 to prevent inadvertent dislodging of a retracted bolt as seen in FIG. 6. The mating flange of the other coupling member 28 is provided with a threaded bore 46 which receives a threaded sleeve 47. Therefore, fastening means 50 including bolt 51, having shank 52, hexhead 53 and threaded body 54 may be turned down relative to coupling member 27 into the threaded sleeve 46 to retain the coupling members together, the hexhead 53 having a peripheral flange adapted to seat within recess 43 as illustrated.

In order to provide for a predetermined orientation of the coupling members 27 and 28 to one another prior to their being fastened by the exemplary fastening means, indicated generally at 50, means are provided for locating the two coupling members relative to one another preparatory to operating the fastening means. In the exemplary embodiment, such locating means include the provision of locating pins, as pin 55 in FIG. 5, which have a threaded body 56 protruding axially of the coupling member. An appropriate mating blind bore 58 may be provided in the flange of the other connector member 27 in three spaced locations, as seen in FIG. 2, to mate with the associated pins 55.

Provision may also be made in the conduit coupling means of the present invention to provide for the connection and orientation of choke and kill lines run from the vessel to the well. As seen in FIG. 3, a flow line type coupling may be provided in the form of line couplings 60 and 61 mounted on the connector members 27 and 28, respectively. Associated flow lines 62 and 64 for a stab-connect engagement with the associated line couplings 60 and 61 in otherwise conventional manner.

While the effectively continuous arcuate surface described hereinabove and illustrated in FIGS. 1–6 for the outer configuration of the coupling will provide a desirable distribution of stress and bending under deep subsea conditions so as to prevent stress concentration in the coupling, it has been determined that to provide the theoretical optimum distribution of stress and bending in the coupling would require an outer configuration defined by one-half of a parabolic curve.

With this configuration, the axis of the parabola would be parallel to the axis of the riser bore, the vertex of the parabola would be located near the radial edge of the flange, and the extremity of the parabolic curve would asymtotically approach the outer wall of the riser, away from the flange. However, to construct such an ideal coupling would require the construction of a coupling having a length many times greater than is practical to manufacture or efficient to handle.

It has been discovered that the benefits of a parabolic curve can be substantially obtained for a coupling practical to manufacture and efficient to handle by the use of an elliptical curve, specifically a quarter of an ellipse. Because the curves of an ellipse do become tangent with their outer limits, it is possible to construct a coupling of conventional and desirable length as opposed to the very long couplings which would be necessitated by use of a parabolic curve if a smooth surface transition is desired between the curved surface of the coupling and the straight surface of the riser conduit section.

FIG. 7 illustrates a preferred exemplary configuration of such an elliptical outer surface for a coupling. This coupling member 27' comprises flange 37', tubular portion 39', and outer surface 41'.

It is the general intent of this invention to provide for the design of conventionally sized coupling having an outer surface configuration which has an elliptical shape, specifically a quarter of an ellipse where one end of the curve becomes tangent to the riser conduit section and the outer end becomes tangent to the horizontal, upper surface of the flange.

In veiw of the general formula of an ellipse ($X^2/a^2 + Y^2/b^2 = 1$, if "a" and "b" are equal (i.e. the major and minor axes are of equal length), the ellipse becomes circular in shape; and it is intended that the general term "ellipse" include the specie of circles.

However, it is preferred, as shown in FIG. 7, that the quarter elliptical curve not be circular in shape, but rather have a relatively long major axis parallel to the axis of the riser bore and a shorter minor axis.

By way of example only, the coupling member 27' of FIG. 7 could be designed for attachment to a riser conduit section having an inner diameter of 17½ inches and an outer diameter of 20 inches. The coupling member itself would have an inner diameter of 17½ inches and an outer diameter at the weld connection to the attached riser conduit section of 20 inches. The elliptical curve becomes tangent to the vertical approximately ½ inch below the center of the weld to insure a smooth surface transition from the coupling, through the weld, and to the linear riser conduit section. The ellipse has a major axis of 18 inches and a minor axis of 9 inches. In general, it is preferred that the ellipse have a major axis twice the length of the minor axis. It is also generally preferred that the major axis of the ellipse be approximately equal to the outer diameter of the riser conduit section.

It has also been determined that the benefits of the elliptical outer configuration can be substantially retained while reducing the weight and the amount of material required to manufacture the coupling by having the elliptical curve become tangent to a sloped line at point A of approximately 10° (such as between 8° and 12°) rather than extend to the bottom of the curve and become tangent to the horizontal. This allows for a coupling of relatively reduced size and weight while still having a smooth outer surface configuration with no breaks in continuity which could produce stress concentrations. The 10° sloped surface continues to a point 2 inches from the end of the flange which is provided with a small 45° beveled surface.

From the foregoing, it should be apparent to those skilled in the art that a marine riser conduit section coupling has been disclosed which is adapted to withstand high riser tension and bending loads in deep subsea well drilling and production operations by preventing the presence of stress concentrations. The upper and lower coupling members are each provided with fastening means for securing the coupling members together via flanges of the members and importantly, each member is provided with an effectively continuous arcuate surface extending circumferentially about substantially the entire outer surface of each member to prevent stress concentrations in the coupling members which might otherwise occur under the tension and bending loads normally encountered in subsea well operations of this nature. Further, it should be understood by those skilled in the art that various modifications, adaptations and alternations may be made in the exemplary embodiment of riser conduit section coupling means within the scope and spirit of the present invention which is defined by the following claims.

We claim:

1. A marine riser conduit section coupling adapted to withstand high rise tension and bending loads encountered in deep subsea well drilling and production operations comprising:
    tubular portion means for connecting with the associated riser conduit section;
    flange portion means for abutting connection with another coupling connected to its associated riser conduit section; and
    outer surface configuration means extending circumferentially about said coupling and extending from said tubular portion means to said flange portion means for preventing stress concentration in said coupling, wherein said outer surface configuration means comprises a curve defined by substantially a quarter of an ellipse which extends from near the extremity of the tubular portion means toward the radial extremity of the flange portion means, and wherein said ellipse has a major axis about twice the length of its minor axis, and said major axis is parallel to the axis of the riser conduit section.

2. A marine riser conduit section coupling adapted to withstand high riser tension and bending loads encountered in deep subsea well drilling and production operations comprising:
   tubular portion means for connecting with the associated riser conduit section;
   flange portion means for abutting connection with another coupling connected to its associated riser conduit section; and
   outer surface configuration means extending circumferentially about said coupling and extending from said tubular portion means to said flange portion means for preventing stress concentration in said coupling, wherein said outer surface configuration means comprises a curve defined by substantially a quarter of an ellipse which extends from near the extremity of the tubular portion means toward the radial extremity of the flange portion means, wherein said ellipse has a major axis about twice the length of its minor axis and said major axis is parallel to the axis of the riser conduit section, and wherein said curve, as it approaches the flange portion means, becomes tangent to and merges into a radially outwardly extending linear portion having a slope of between about 8° and 12°.

3. A marine riser system adapted to withstand high riser tension and bending loads in deep subsea well drilling and production operations comprising:
   a plurality of connected riser conduit sections, each conduit section having at its two ends an integrally attached coupling by which each conduit section is connected to the adjacent conduit section;
   wherein each said coupling comprises:
   a tubular portion means for integral attachment with its associated riser conduit section;
   a flange portion means for abutting connection with another flange portion means of another coupling which is integrally attached to its own associated riser conduit section; and
   outer surface configuration means extending circumferentially about said coupling and extending from said tubular portion means to said flange portion means for preventing stress concentration in said coupling, wherein said outer surface configuration means comprises a curve defined by substantially a quarter of an ellipse which extends from near the extremity of the tubular portion means toward the radial extremity of the flange portion means, and wherein said ellipse has a major axis about twice the length of its minor axis, and said major axis is parallel to the axis of the riser conduit section.

4. A marine riser system adapted to withstand high riser tension and bending loads in deep subsea well drilling and production operations comprising:
   a plurality of connected riser conduit sections, each conduit section having at its two ends an integrally attached coupling by which each conduit section is connected to the adjacent conduit section;
   wherein each said coupling comprises:
   a tubular portion means for integral attachment with its associated riser conduit section;
   a flange portion means for abutting connection with another flange portion means for another coupling which is integrally attached to its own associated riser conduit section; and
   outer surface configuration means extending circumferentially about said coupling and extending from said tubular portion means to said flange portion means for preventing stress concentration in said coupling, wherein said outer surface configuration means comprises a curve defined by substantially a quarter of an ellipse which extends from near the extremity of the tubular portion means toward the radial extremity of the flange portion means, wherein said ellipse has a major axis about twice the length of its minor axis and said major axis is parallel to the axis of the riser conduit section, and wherein said curve, as it approaches the flange portion means, becomes tangent to and merges into a radially outwardly extending linear portion having a slope of between about 8° and 12°.

* * * * *